(12) United States Patent
Yu et al.

(10) Patent No.: US 9,891,645 B2
(45) Date of Patent: *Feb. 13, 2018

(54) PROGRESSIVE OPTIMIZATION DISPATCHING METHOD OF SMART DISTRIBUTION SYSTEM

(71) Applicants: JIANGSU ELECTRIC POWER COMPANY NANJING POWER SUPPLY COMPANY, Nanjing (CN); STATE GRID CORPORATION OF CHINA, Beijing (CN); HOHAI University, Nanjing (CN); JIANGSU ELECTRIC POWER COMPANY, Nanjing (CN); Nanjing Hehai Technology Limited Company, Nanjing (CN); China Electric Power Research Institute, Beijing (CN)

(72) Inventors: Kun Yu, Nanjing (CN); Peifeng Shen, Nanjing (CN); Xingying Chen, Nanjing (CN); Tingji Chen, Nanjing (CN); Kai Chen, Nanjing (CN); Hong Zhu, Nanjing (CN); Lei Wei, Nanjing (CN); Jing Xiao, Nanjing (CN); Chunning Wang, Nanjing (CN); Jianguo Yao, Nanjing (CN); Yingchen Liao, Nanjing (CN); Min Cai, Nanjing (CN)

(73) Assignees: JIANGSU ELECTRIC POWER COMPANY NANJING POWER SUPPLY COMPANY, Nanjing (CN); STATE GRID CORPORATION OF CHINA, Beijing (CN); HOHAI UNIVERSITY, Nanjing (CN); JIANGSU ELECTRIC POWER COMPANY, Nanjing (CN); NANJINGHEHAI TECHNOLOGY LIMITED COMPANY, Nanjing (CN); CHINA ELECTRIC POWER RESEARCH INSTITUTE, Beijing (CN)

( * ) Notice: Subject to any disclaimer, the term of this patent is extended or adjusted under 35 U.S.C. 154(b) by 364 days.

This patent is subject to a terminal disclaimer.

(21) Appl. No.: 14/647,910

(22) PCT Filed: Jun. 10, 2014

(86) PCT No.: PCT/CN2014/079573
§ 371 (c)(1),
(2) Date: May 28, 2015

(87) PCT Pub. No.: WO2015/062277
PCT Pub. Date: May 7, 2015

(65) Prior Publication Data
US 2016/0239032 A1 Aug. 18, 2016

(30) Foreign Application Priority Data
Oct. 30, 2013 (CN) .......................... 2013 1 0525909

(51) Int. Cl.
*G05D 3/12* (2006.01)
*G05D 5/00* (2006.01)
(Continued)

(52) U.S. Cl.
CPC ............... *G05F 1/66* (2013.01); *G05B 15/02* (2013.01); *G06Q 10/04* (2013.01); *G06Q 10/06* (2013.01);
(Continued)

(58) Field of Classification Search
CPC .......... G05F 1/66; G05B 15/02; G06Q 10/04; G06Q 10/06; G06Q 50/06; Y02E 40/76
(Continued)

(56) References Cited

U.S. PATENT DOCUMENTS

| | | | |
|---|---|---|---|
| 2009/0062969 A1* | 3/2009 | Chandra | G06Q 10/06 700/291 |
| 2010/0094573 A1* | 4/2010 | Yang | H02J 3/00 702/61 |

(Continued)

FOREIGN PATENT DOCUMENTS

| | | |
|---|---|---|
| CN | 102945296 | 2/2013 |
| CN | 102969787 | 3/2013 |

(Continued)

*Primary Examiner* — Mohammad Ali
*Assistant Examiner* — Md Azad
(74) *Attorney, Agent, or Firm* — Treasure IP Group, LLC

(57) ABSTRACT smart power distribution system and a method to progressively dispatch the power is described. The method steps are all automatic and self-adaptive. The method can be executed in an unattended manner to automatically correlate real time data vs. historical data, planning data vs. operation data. Based on a long cycle periodical variation and short-term random variations in load, and taking into account the temporary load power supply and maintenance needs, a multi-stage progressive multiple time scales optimal dispatching method is developed, including the distributed power, micro-grids, energy storage devices, electric vehicles charge-discharge facility and other elements of the Intelligent power distribution systems, to achieve coordinated operation of the network, power, load resources to ensure a continuous safe and reliable smart power distribution system operated at high quality and efficiency.

7 Claims, 2 Drawing Sheets

(51) Int. Cl.

| | | |
|---|---|---|
| *G05D 9/00* | (2006.01) | |
| *G05D 11/00* | (2006.01) | |
| *G05D 17/00* | (2006.01) | |
| *G05D 23/00* | (2006.01) | |
| *G05F 1/66* | (2006.01) | |
| *G06Q 10/04* | (2012.01) | |
| *G06Q 10/06* | (2012.01) | |
| *G06Q 50/06* | (2012.01) | |
| *G05B 15/02* | (2006.01) | |

(52) U.S. Cl.
CPC ............ *G06Q 50/06* (2013.01); *Y02E 40/76* (2013.01); *Y04S 10/54* (2013.01); *Y04S 10/545* (2013.01)

(58) Field of Classification Search
USPC ........................................................ 700/295
See application file for complete search history.

(56) References Cited

U.S. PATENT DOCUMENTS

| | | | |
|---|---|---|---|
| 2010/0114799 A1* | 5/2010 | Black | G06Q 50/06 705/412 |
| 2011/0068631 A1 | 3/2011 | Roscoe | |
| 2011/0071693 A1* | 3/2011 | Sun | G06F 17/30557 700/291 |
| 2011/0231028 A1* | 9/2011 | Ozog | G06Q 10/06 700/291 |
| 2012/0143385 A1* | 6/2012 | Goldsmith | H02J 3/38 700/297 |
| 2014/0336960 A1* | 11/2014 | Haghighat-Kashani | G06Q 10/04 702/60 |
| 2015/0207321 A1* | 7/2015 | Kashiwagi | G05B 15/02 700/286 |

FOREIGN PATENT DOCUMENTS

| | | |
|---|---|---|
| CN | 103066592 | 4/2013 |
| CN | 103280810 | 9/2013 |
| CN | 103677892 | 2/2014 |

* cited by examiner

PROGRESSIVE OPTIMIZATION DISPATCHING METHOD OF SMART DISTRIBUTION SYSTEM

CROSS REFERENCE TO RELATED APPLICATION

This application claims priority to, PCT application PCT/CN2014/079573, filed on Jun. 10, 2014, which in turn takes priority from a Chinese application 201310525909.4, filed Oct. 30, 2013.
The PCT application and the Chinese application is incorporated herein by reference in their entirety.

FIELD OF THE INVENTION

The present invention is directed to a smart power distribution system using progressive dispatching method, which belongs to the technical field of smart dispatching.

BACKGROUND

Power distribution network is the connection between the power transmission grid and the user. Optimizing a dispatching method for a power distribution network can achieve an optimal allocation of various resources, which is a key element in a construction of a smart grid. With the development and application of distributed power generation technologies, many kinds of distributed power supplies and distribution network in the cold, heat and power cogeneration and other energy supply modes have appeared. Further, small capacity distributed power supplies can directly connect to users and form micro grids, then such micro grids can access the distribution network and network operation in many different ways. When the distributed power source and a variety of large-capacity shock loads, such as electric vehicle charging and discharging facilities, access the distribution network, and when more and more large motors, air conditioners and other large-capacity dynamic loads are used, the operating characteristics of the distribution network are changed. As a result, the operating status of the distribution network changes much more frequently, and the distribution network becomes less reliable, quality of the power supply declines, and voltage instability will occur. Therefore, it is necessary to optimize the dispatch of the distributed power distribution network through a distributed power and load, to achieve energy efficient operation and emission reduction.

The power system has experienced a traditional economic dispatching, market competition dispatching, energy generation dispatching, dispatching towards a low-carbon, smart dispatching direction, but these studies focus on the transmission grid. With the development of smart grid distribution network, distributed power dispatching also begins to receive attention and a lot of research is underway in the areas of network operation, interruptible load and response with other demands, distributed power dispatching. However, for the actual distribution network, because there is not much measured data and high quality data, the current dispatching method is not very intelligent. The current dispatch method mainly relies on experience, or even in a "blind tune" state.

By analyzing the smart distribution network optimization objectives, dispatching objective, a smart distribution grid energy flow, interaction patterns of information flow and traffic flow, the present invention provides a dispatching method for a smart power distribution system, having progressive optimization on multiple time scales. The optimal dispatching method has new physical structures and characteristics of a distribution network, as well as an optimal dispatching mode toward distribution network dispatching objectives. This key technology provides support to the realization of coordinated dispatching among the distribution network, power source and load.

SUMMARY OF THE INVENTION

The Purpose of the Invention

This invention provides a smart distribution system of a progressive dispatching method. It can automatically coordinate real-time data vs. historical data, planning data vs. operation data, according to the load of long term periodical variations, short-term random variations. Taking in to account of the temporary load power supply and the maintenance requirements, a multi-stage progressive multi time scale dispatching optimization method is developed. The smart distribution system includes the distributed power source, micro grid, energy storage device, and other smart power distribution system elements such as electric vehicle charging and discharging facilities. The smart distribution system can realize a coordinated operation between network, power supply, load resource to ensure a continued safe reliable and high quality distribution system to operate efficiently.

Technical Solution

The present invention provides a technical solution for a smart power distribution system, which performs progressive dispatch. The method uses the principle of the "local equilibrium—partition coordination—overall adoption" to coordinate the distributed power, micro-grids, energy storage devices, controllable load dispatching objects, to improve reliability of the power supply and economy of the distribution network, and to realize an efficient operation of the smart distribution system. The invention discloses a four-phase system and their individual dispatch method, and the relationships between them. The four-step progressive dispatching method specifically includes steps as follows:
1) The method is provided to use a long-term optimization dispatching coordination model to achieve network load source development. The steps include
    to connect the distributed power source, interruptible load, energy storage devices to the distribution network through switches, and the switches determine their respective access to the distribution network;
2) The method is provided to use a mid-long term optimization dispatching mode to coordinate under changeable normal operation conditions including load periodical variation, inspection, and maintenance triggered temporary power supply. The method includes the steps of
    to develop working day load curves and holiday load curves,
    to calculate various energy loss rate for the smart power distribution system under the various operating modes,
    to select the least power loss rate operation modes for working day and holiday,
    according to the fact that working days and holidays are alternating in a continuous schedule, to compare the difference of operation mode between adjacent working days and holidays, and
    to obtain a long-term switch operation scheme;

3) The method is provided to use coordination model for a short-term optimization dispatching plan, implementation of temporary repair and temporary holding for multi-period energy balance and operation mode. The steps are:

according to the load change with time and the maintenance trends information, the next day load curve is divided into several periods, for each time period the rate of energy loss is calculated under various operating mode, and to select the least power loss rate operation mode, then according to the difference between sequential comparison operation, obtain short-term switch operation scheme;

4) The method is provided to use ultra-short-term optimization dispatching mode to achieve ultra-short-term energy balance and fault and defect management in network load source interaction. The steps are in the events of emergencies, adjusting the power level of the distributed power and energy storage device, or transferring the load onto the other feeders. If a fault or defect signal is received, turn the switch attached to the defect or fault area to off, at the same time, turn the switch associated with load which experience power loss to close. Otherwise, if an abnormal signal of the load or the distributed power output is received, charging and discharging state will be changed to balance the sudden energy change of the energy storage device. If the energy storage device loses the ability to regulate, then the controllable distributed power output will be adjusted to balance the sudden energy change.

Beneficial effects: the smart power distribution system of the present invention uses a multi-stage progressive optimization dispatching method to get the following results:

1, through long-term optimal dispatching, the difference between peak and valley in a load as well as the peak load is reduced; the distribution feeder focal points, distributed power, interruptible load planning such as electric vehicle charging and discharging facilities, can all be optimized;

2, through long-term optimal operation, normal operation mode can be optimized to improve the efficiency of smart power distribution system operation;

3, through short-term optimization, dispatching can improve energy efficiency, reduce users payment for energy and the total demand for energy in a local area, reducing the peak-valley difference, while influencing the long-term optimization dispatching method, ultimately to improve the smart power distribution system operation efficiency;

4, through the ultra-short-term optimization dispatching, to achieve ultra-short-term energy balance, smooth load curve, reduce peak-valley difference, while long-term optimization dispatching stage will ultimately have an impact on and improve the smart distribution grid operation efficiency.

DETAILED DESCRIPTION OF THE PREFERRED EMBODIMENTS

Below in connection with the accompanying drawings and specific embodiments, further illustrate the present invention, these examples are merely illustrative of the present invention, and it is not intended to limit the scope of the invention. After reading the present invention, any modifications by those skilled in the variety of the present invention are equivalents falling within the present application as defined by the appended claims scope.

Figure 1:
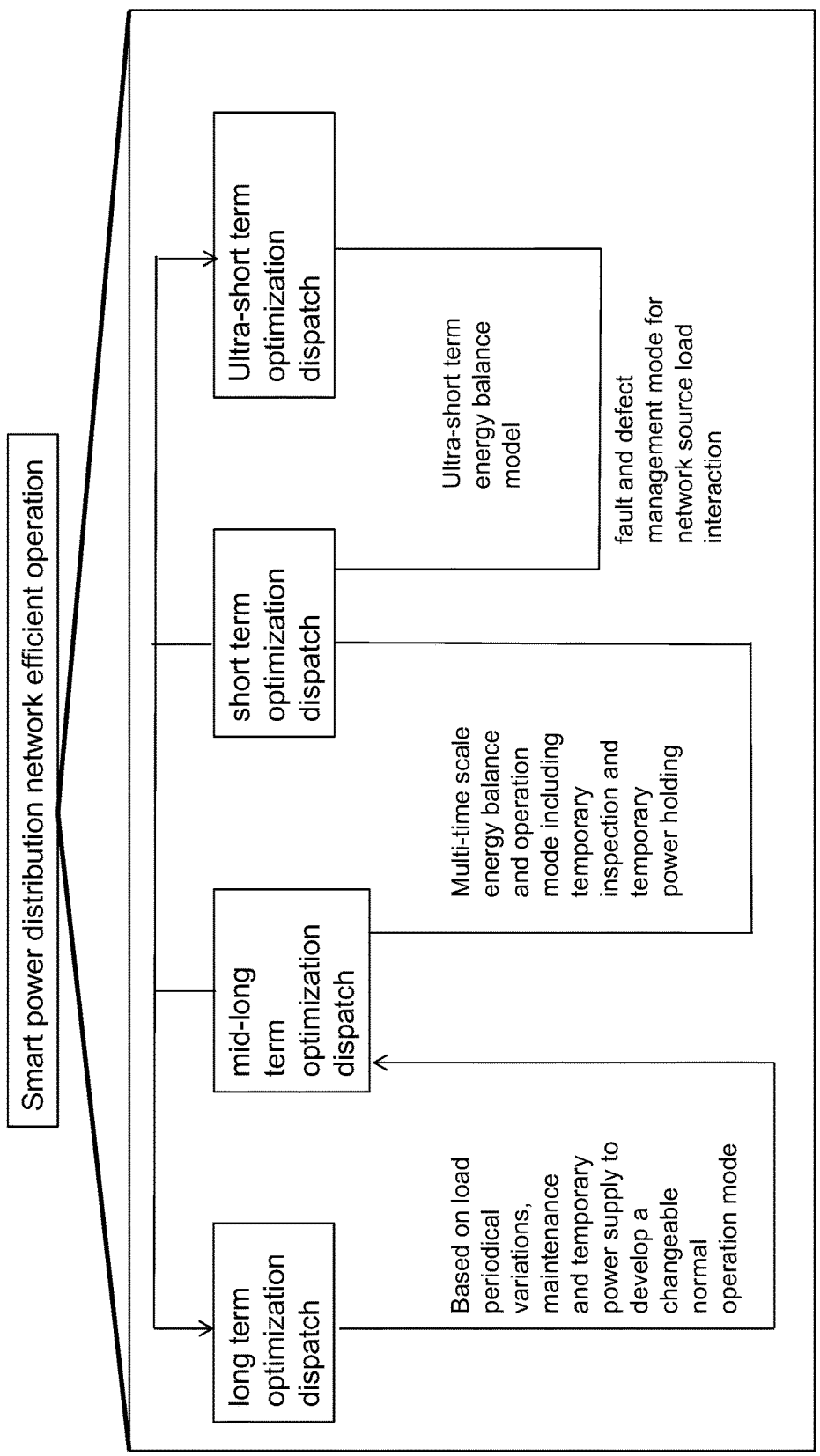
FIG. 1 is a flowchart of a smart distribution system optimizing multi-stage progressive dispatching scheme.
Figure 2:
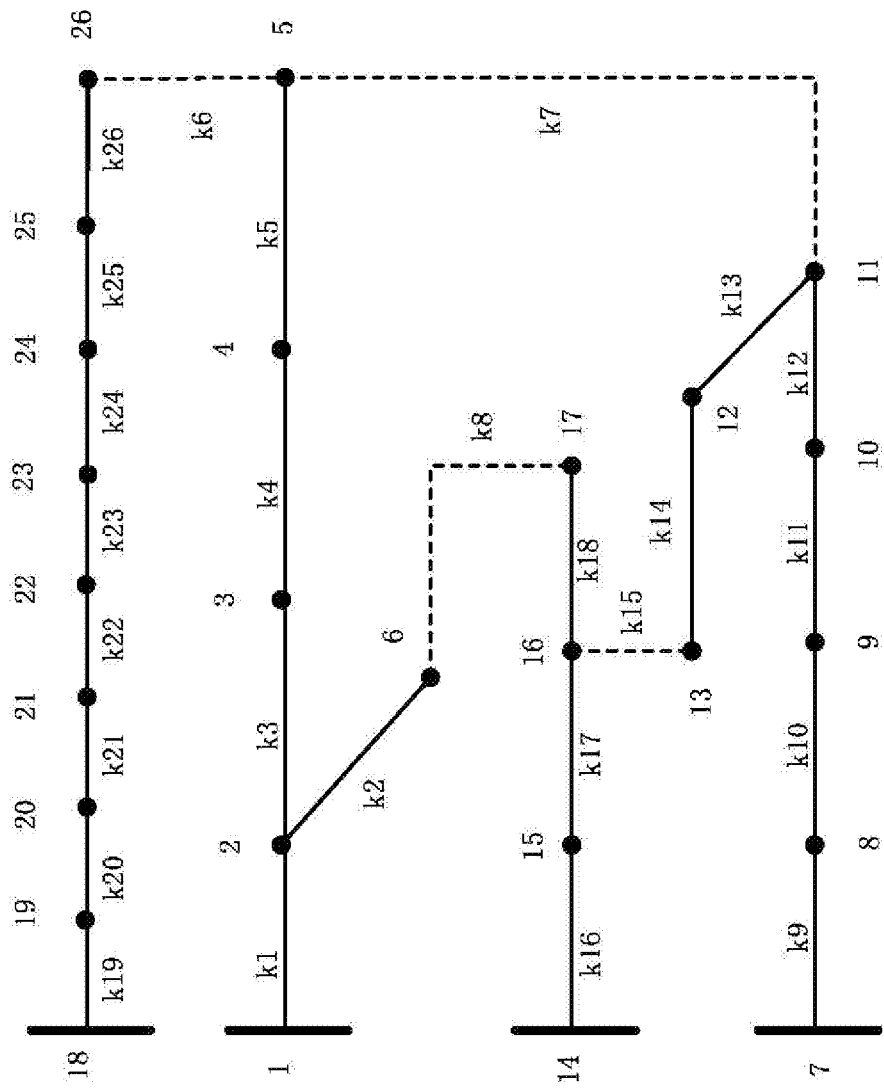
FIG. 2 is a schematic diagram of the structure of the experimental system of a smart power distribution system.

As shown in FIG. 1, the invention of a smart power distribution system proposes a progressive dispatching method, including four steps of: long-term, mid-long-term, short-term and ultra-short-term optimal dispatching. Long-term optimization dispatching is a structural transformation of the distribution network, including lines, switches, distributed power source, energy storage devices, interruptible load and other electrical equipment. This can ensure that the important users can have different types of power supply: they can dispatch the use of interruptible load as resource, change the load curves based on electric vehicle charging and discharging protocol through these networks. Coordinating network, power and load, reduces the difference between peak and valley in a load and reduces the occurrence of peak load. Together with the use of controllable distributed power supply, the method improves reliability of power supply, makes the best use of clean, renewable energy generation to achieve energy conservation. For the experimental system of the invention, the grid structure and parameters are as shown in FIG. 2, including four feeders, 26 topological nodes and 22 section switches and four contact switch structures. If the load is increased by 10%, when a fault occurs at between node 21 and node 22, the load between node 22 and node 26 can only get power supply by the mother line between node 1 or node 7. Because of the capacity limitation, it can't restore the load between node 22 and node 26. If a contact line and liaison between node 3 and node 22 is placed, or an access to energy storage device at node 23 is allowed, node 26 has access to the distributed power, then the power supply for all loads between 22 node and 26 node can be supplied by the mother line from node 1 to node 7.

Mid-long term optimization dispatching mode is to coordinate under changable normal operation conditions including load periodical variation, inspection, and maintenance triggered temporary power supply. The method include the steps of developing working day load curves and holiday load curves, calculating various energy loss rate for the smart power distribution system under the various operating modes, selecting the operation modes having the least power loss rate for working day and holiday; according to the fact that working days and holidays are alternative continued in schedule, comparing the difference of operation modes between adjacent working days and holidays, to obtain a long-term switch operation scheme. For example, based on the typical load curve of the holidays, in FIG. 2, when the switch between node 11 and node 12 is off, close the switch between node 13 and node 16, close the switch between the node 4 and node 5, close the switches between node 5 to node 11. By doing so, the system's energy consumption is at 5.2%. The output switching steps are, closing the switch between 13 and 16 nodes, then disconnected the switches between node 11 and 12 nodes, after that close the switch between node 5 and node 11, and at the end disconnect the switch between node 4 and node 5.

Coordination model of short-term optimal dispatching plan help the implementation of temporary repair and temporary electricity holding at multi period energy balance and operation mode. The steps are to follow the trend of load changes with respect to time and the maintenance information, diving the next day load curve into several periods. For example: if the line between node 5 and node 11 requires temporary maintenance, the load curve is divided into a first period having more than 70% of the maximum load peak, a second period a low load period, having less than 50% of the average load, and other periods of there in between. In the medium to long term optimal dispatching method, executing changable normal operation mode, for example in FIG. 2, when the switch between node 11 and node 12 is off and the switch between node 13 and node 16 is closed, a trend data of the smart power distribution system for each period is calculated. Further a power loss rate for each period can be collected statistically, and an operation mode having the least power loss rate can be selected. By comparison of the difference between each operation mode in accordance with their time sequence, a switch operation plan can be subsequently developed. For example in FIG. 2, disconnecting the switches between node 13 and node 16, closing the switch between node 11 and node 12, then the power loss of the system is at 5.4%. As for the steps for output switching, for example first closing the switch between node 4 and node 5, and then disconnect the switch between node 5 and node 11, and then close the switch between node 11 and node 12, and finally disconnect the switch between node 13 and node 16.

Ultra-short-term optimization dispatching plan is used to achieve ultra-short-term energy balance and network load source interactive processing for fault and defect management. The steps are the following. In the event of emergencies, such as when the total load is at 16581 kW+j8014kvar, and node 9 is a critical load in need of a reliable power supply, if a fault occurs at node 8, causing downstream nodes to have outage, then the switch connected to node 8 is disconnected and set the switch connecting to the load which lost power to close. For example, as in FIG. 2, first turning off the switch K13 between node 11 and node 12, then turning off the switch K7 between node 5 and node 11, and finally turning off the switch K15 between node 13 and node 16. Otherwise, if a sudden change in the load or in a distributed power output is received, for example, the load at node 23 suddenly increases by 30%, then energy charging and discharging state of the system has to be changed to balance the sudden change in energy, for instance, the energy storage device at this node will discharge. If the energy storage device loses its ability to self regulate, such as the load at node 23 double the load suddenly, then the controllable distributed power output can be adjusted to balance the sudden energy change, for example, increasing the power output of the distributed power installed at node 26.

The technical scheme of the present invention is not limited to the above described embodiments, where the use of equivalent technical solutions are formed to replace the requirements of the present invention, would be in the scope of the present invention.

We claim:

1. A method for managing a smart power distribution system, the method comprising:
   performing a four-step progressive dispatching long-term, mid-long-term, short-term and ultra-short-term optimal dispatching for the smart power distribution system, characterized in that:
   1) using a long-term optimization dispatching coordination model to achieve network load source development by connecting a plurality of distributed powers, interruptible loads and energy storage devices to a distribution network through switches, in which each switch opens and closes to allow access to the power distribution system;
   2) using a mid-long term optimization dispatching model to coordinate under changeable normal operation conditions including load periodical variation, inspection, and maintenance triggered temporary power supply by calculating loss rates of the smart power distribution system under various different operating modes using working day load curves and holiday load curves respectively,
   selecting least power loss rate operation modes for each working day and holiday period, according to the sequence that working day and holiday alternate in time, comparing the difference between adjacent working day and holiday operation modes, and determining a mid to long term switch operating scheme;
   3) using a coordination model for a short-term optimization dispatching plan, implementation of temporary repair and temporary holding for multi-period energy balance and operation mode by
   dividing a next day load curve into different periods according to the load change trend with respect to time and maintenance information,
   calculating loss rates of the smart power distribution system under different operating modes for each period,
   selecting operation modes having the least power loss rate for each period,
   comparing the difference between the second operation modes according to time sequence, and determining a short term switch operation scheme;
   4) using ultra-short-term optimization dispatching model to achieve ultra-short-term energy balance and fault and defect management in network load source interaction by adjusting the power level of the distributed power and energy storage device in the event of emergencies, or transferring the load to other feeders,
   using coordination model of short-term optimal dispatching plan help implementation of temporary repair and temporary electricity holding at multi period energy balance and operation mode, characterized in that
   dividing a load curve into
   a first period, a peak load period, having more than 70% of a maximum load,
   a second period a low load period, having less than 50% of an average load, and other periods of there in between;
   executing an adjustable normal operation mode, calculation a trend data of the smart power distribution system for each period when one or more switches are closed and off;
   collecting a power loss rate for each period statistically,
   selecting an operation mode having the least power loss rate;
   planning a switch operation plan after comparing difference between each operation mode in accordance with their time sequence;
   disconnecting switches or close switches when a power loss of the system is at 5.4%.

2. The method of claim 1, wherein the step 1 further comprises
   reducing the difference between peak and valley in a load;
   reducing as occurrences of peak load; and
   optimizing distribution feeder focal points, distributed power and interruptible load including planning for electric vehicle charging and discharging facilities.

3. The method of claim 2, wherein the step 1 further comprises
   ensuring important users have different power supplies;
   dispatching the use of interruptible load as resource; and
   changing the load curves based on electric vehicle charging and discharging protocol through networks.

4. The method of claim 1, wherein the step 2 further comprises maintaining a system's energy consumption is at 5.2%.

5. The method of claim 1, wherein the step 4 further comprises disconnecting a switch connected to node 8 and setting the switch connecting to the load which lost power to close in the event of emergencies wherein node 9 is a critical load in need of a reliable power supply, and if a fault occurs at node 8, causing downstream nodes to have outage.

6. The method of claim 1, wherein the step 4 further comprises balancing a sudden change in energy by charging or discharging an energy storage device at a node through switch sequences:

first turning off the switch K13 between node 11 and node 12, then turning off the switch K7 between node 5 and node 11, and finally turning off the switch K15 between node 13 and node 16 when a sudden change at 30% in the load or in a distributed power output is received.

7. The method of claim 6, wherein the step 4 further comprises increasing power output of the distributed power installed at node 26 to balance the sudden energy change when load at node 23 double the load suddenly as the energy storage device loses its ability to self regulate.

* * * * *